July 6, 1965 D. K. SAMPSON 3,193,810

HEAD POSITIONING MECHANISM

Filed June 2, 1959 2 Sheets-Sheet 1

INVENTOR
DONALD K. SAMPSON

BY Cushman, Darby & Cushman
ATTORNEYS

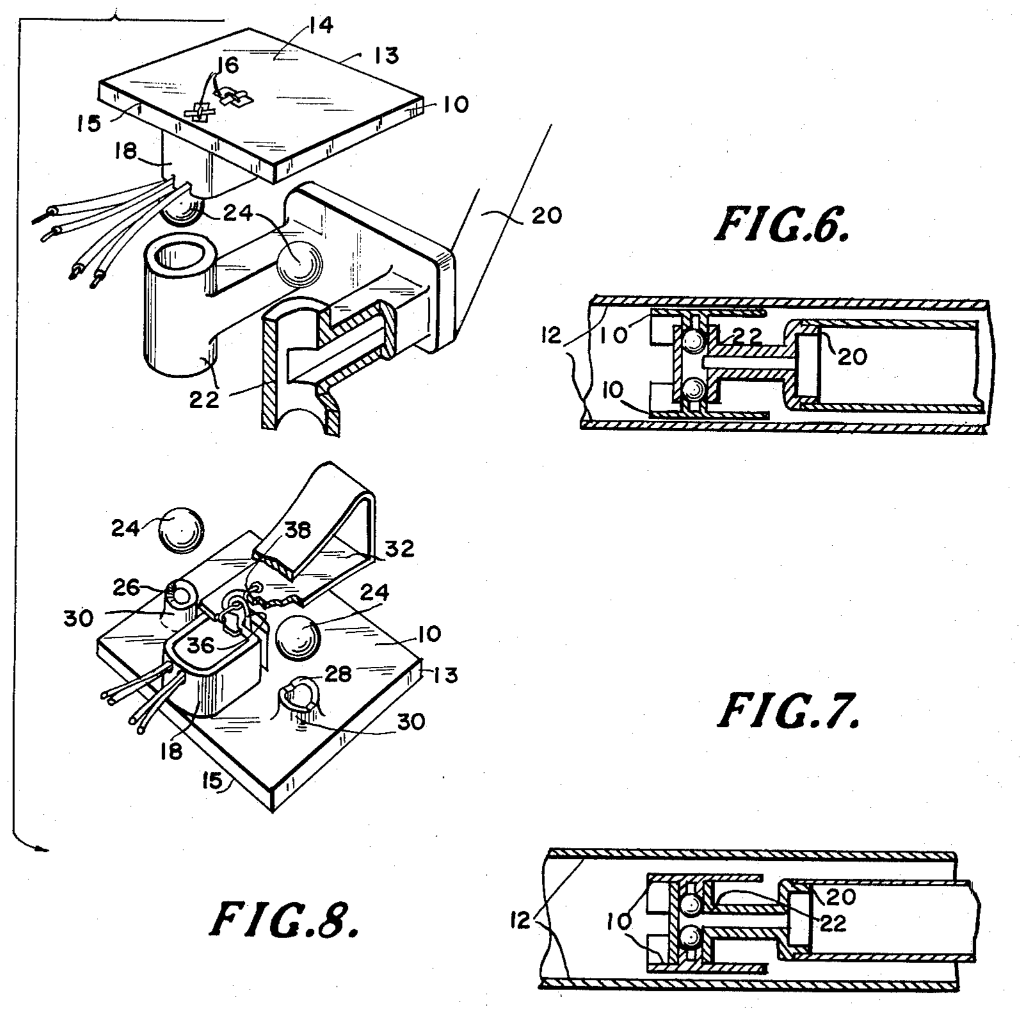
FIG. 5, FIG. 6, FIG. 7, FIG. 8
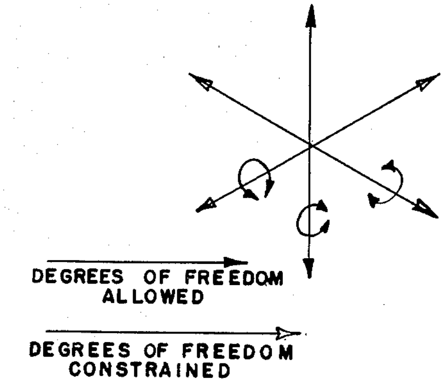
INVENTOR
DONALD K. SAMPSON
BY Cushman, Darby & Cushman
ATTORNEYS United States Patent Office 3,193,810
Patented July 6, 1965

3,193,810
HEAD POSITIONING MECHANISM

Donald K. Sampson, St. Paul, Minn., assignor to Sperry Rand Corporation, New York, N.Y., a corporation of Delaware Filed June 2, 1959, Ser. No. 817,560
21 Claims. (Cl. 340—174.1)

This invention pertains to positioning mechanisms, and more particularly to an improved mechanism utilizing fluid pressure for positioning a member in a predetermined relationship against a force tending to displace it from such relationship. Although capable of varied utilization, the mechanism of this invention is especially adapted for use in recording systems, as in conjunction with the data storage medium of an electronic computer. For the purpose of convenient description, therefore, the improved positioning mechanism is so described and illustrated hereinafter.

Present day large scale electronic computers require the storage of extensive amounts of information in the form of digitized data. The most widely used method of achieving this storage capacity is through use of a magnetizable recording surface, such as the peripheral surface of a cylindrical drum, or the flat surface of a tape or disc, upon which each bit of data occupies a small portion of the area thereof. Since the stored information must be readily accessible when required, the surface on which the data is stored in rotated or moved at high speeds. As a selected area passes a point, information is read therefrom or stored therein by a transducer member in proximity thereto which is provided with signal means through which information or data is transmitted. The transducer, generally referred to in the art as a read-write head, should, for optimum performance, be located and maintained in a predetermined position relative to but usually spaced from the moving recording surface.

This spacing between the head and storage members may be maintained in various ways, a familiar example being the "needle" of an ordinary phonograph. Another method, curretly utilized in the art and illustrated herein, is to provide the head with a bearing face or surface directly opposing the proximate moving recording surface which, due to its movement, carries with it a boundary layer of the fluid, usually air, in which it is immersed. This layer constitutes a fluid cushion between the bearing and recording surfaces which will exert a force thereon inversely related to the clearance distance therebetween, tending to keep the head and storage members separated. A detailed analysis of slider bearing theory may be found in an article by M. Muskat, F. Morgan, and M. W. Meres entitled "The Lubrication of Plane Sliders of Finite Width" published in the "Journal of Applied Physics" of March 1940. Without delving at great into the theory of this subject, it will be realized that for a given set of conditions, e.g., fixed recording surface speed, fluid viscosity, bearing surface area to head mass ratio, etc., a constant separating force will be exerted upon the bearing and recording surfaces by the fluid cushion for any predetermined clearance distance therebetween. By fixing either the head or storage member against movement away from the other member, and by applying a constant force to the other member counteracting the force exerted by the fluid cushion, a fixed clearance distance will be maintained between the two members. The present invention is shown and described hereinafter as applied to an illustrative arrangement in which the storage member is fixed in position; and the head separated therefrom by the fluid cushion, or as known in the art, in "flying position."

The importance of maintaining the counteracting loading force upon the head member constant, or as nearly so as possible, is apparent, for variance thereof changes the clearance distance. Maintenance of a constant loading force thereon is hindered, however, by movement of the head in response to the presence of irregularities in the recording surface. These irregularities cause displacement of the head toward or away from the storage member, depending upon whether they take the form of depressions or protrusions, respectively, as the head seeks to maintain the same relative position to the recording surface.

Thus, due to this movement of the head, the use of springs for application of the loading force thereon has not been entirely satisfactory. As the head member is displaced by irregularities in the record surface, the counteracting force exerted by a spring-type loading apparatus thereon will vary by an amount proportional to said displacement. Additionally, movement of the head due to surface irregularities may be faster than the fastest restoring response of the spring.

There are also occasions when it is desirable to vary the loading force applied to the head; e.g., when the head is being placed in or removed from "flying position," or when a different clearance distance is desired. On these occasions the deficiency of a spring loading means is apparent, since the restoring force exerted by a spring cannot be varied at will.

A further factor to be considered is that the resultant displacing or separating force exerted by the fluid cushion upon the head is also a function of the longitudinal angle of inclination of the head bearing surface. Means for mounting the head must provide the freedom to assume a certain inclination of the leading edge of this surface away from the moving storage surface, consistent with the forces applied, in order to allow the head to assume a stable "flying position" and maintain it. Similarly, an aircraft must be free to assume, by trimming, an attitude of inclination such that the positive angle of attack of the wing is consistent with the load represented by the aircraft. If freedom to assume this inclination is not provided, the forces exerted upon the head will cause the leading edge of its bearing surface to strike the recording surface, with consequent detrimental results in some instances.

Means must therefore be provided to allow the head to assume and maintain the desired inclination. The dynamic response of the head to forces exerted thereon varies inversely with the moving mass thereof. The present invention reduces the mass of the head to a very minimum.

It will thus be evident that the requirements for a head positioning mechanism of the type described are numerous, and not entirely satisfied by known devices employing springs. Therefore, in view of the foregoing remarks, it is an object of the invention to provide an improved mechanism utilizing fluid pressure for positioning a member in a predetermined relationship against a force tending to displace it from such relationship.

It is a further object of this invention to provide such a mechanism which applies a substantially constant loading force on a load-receiving member so as to maintain constant spacing between it and an adjacent member.

A further object of this invention is to constrain undesirable degrees of motion of a load receiving member, yet permit desirable motion thereof.

Another object is to provide a member positioning mechanism which does not add greatly to the mass of the positioned member and thereby decrease its dynamic response.

Another object is to provide a mechanism of the type described in which the applied loading force can be conveniently varied at will, remote from the site thereof, if desired. Previous positioning mechanisms of this general type have required screw driver adjustments and/or flexing of holding springs to adjust the same, which necessitated access thereto.

Another object is to provide such a loading means in which identical loading forces can be applied to two or more load-receiving members.

Still another object is to provide a simplified mechanism of the type described so that component parts of wider tolerances can be utilized, with consequential economy of construction and ease of maintenance.

Still other objects and advantages will be in part evident and in part pointed out hereinafter in the following detailed description of an illustrative embodiment of the invention, which should be read in conjunction with the accompanying drawings, in which:

FIGURE 5 is an exploded perspective view of still another embodiment of the invention in a recording apparatus;

FIGURES 6 and 7 are diagrammatic side sectional views of the embodiment seen in FIGURE 5, showing the flying and resting positions of the head member respectively, and FIGURE 8 is a diagram of the degrees of freedom allowed and constrained in a head positioned as shown in FIGURE 6.

Figures 1, 2, 3, 4:
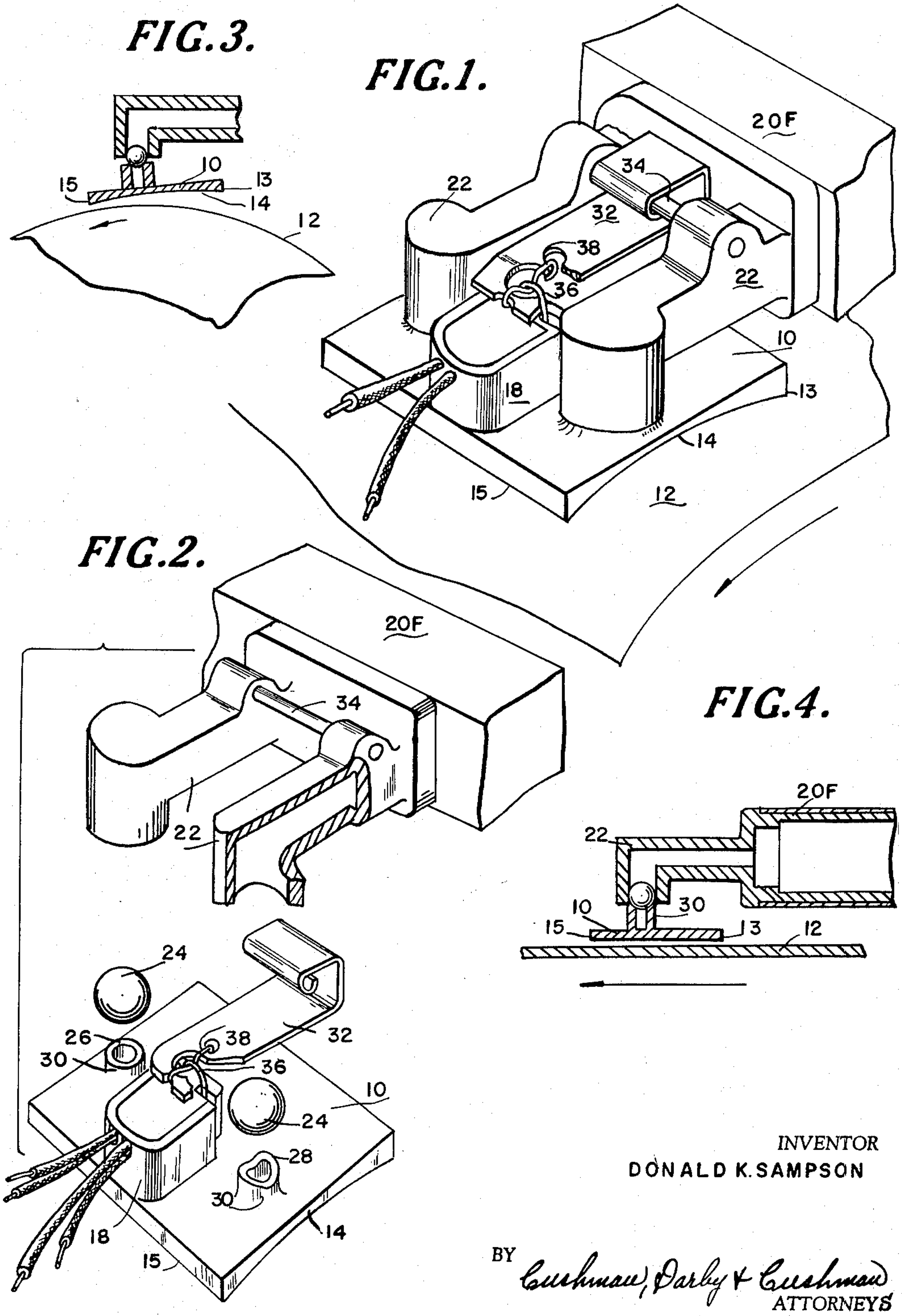
FIGURE 1 is a perspective view of storage and transducer head members of a recording apparatus embodying the invention.
FIGURE 2 is an exploded perspective view of the apparatus seen in FIGURE 1, not showing the storage member, and partially broken away to better show construction.
FIGURE 3 is a diagrammatic side sectional view showing another embodiment of the invention.
FIGURE 4 is a diagrammatic side sectional view showing the head in flying position.

Referring more specifically to the drawings, the head 10 is shown in FIGURE 1 proximate the recording surface 12 of a data storage cylinder. As the surface 12 is driven in the direction indicated by the arrow, it carries with it a boundary layer of fluid traveling in the same direction. This layer or cushion acts upon the bearing surface 14 of head 10, which has leading and trailing edges 13, 15, respectively, tending to force it therefrom. As seen in FIGURES 1 and 3, surface 14 is rounded to correspond to the curvature of the proximate drum surface, and is provided (as best seen in FIGURE 5) with signal transmitting means 16 integral therewith, such signal means having appropriate lead-in connections through a coil member 18 mounted atop head 10.

The concave configuration of bearing surface 14, although desirable when the storage member is in the form of a cylindrical drum, is not absolutely necessary; moreover, when the storage member is a disc or tape, in which case recording surface 12 would be flat, it is preferable that bearing surface 14 also be flat as illustrated in FIGURE 4.

Referring now primarily to FIGURES 1 and 2, the loading and positioning means of the embodiment of the invention illustrated thereby, includes a movable positioning arm 20 or a fixed support 20F which is provided with a passage (not shown) in communication at one end with a source (not shown) of fluid pressure, usually pneumatic; and communicating at its other end with dual L-shaped chambers 22 extending outwardly therefrom. Closely received within each of the cylindrical outer portions of chambers 22, but having a small diametrical clearance therewith, is a ball 24. When the fluid pressure in the arm 20 exceeds atmospheric, the balls 24 are forced towards head 10, and locate in their respective seats 26, 28 upon the terminal portions of pedestals 30. Since the pedestals 30 are an integral part of the head 10, the fluid-pressure force is thereby transmitted directly to the head, forcing it towards the recording surface 12. The fluid-pressure loading force, provided in this manner, must counteract the force resulting from the fluid cushion boundary layer. By proper adjustment of the applied fluid pressure within chambers 22, the head 10 may be positioned so that the forces acting thereon tending to give it translational motion towards and away from the surface 12 will be in equilibrium, and the head will remain fixed in this translational position.

For the purpose of initially placing head 10 into or out of flying position, a spring 32 is secured to arm 20F, as by means of a pin 34 so that it extends outwardly therefrom, or between a pair of heads as is shown in FIGURE 5. Near its outer end(s) spring 32 is loosely coupled to head 10 via bail 36 and captured hook 38. Since the spring is so stressed as to exert a force pulling the head away from the recording surface, the action of this spring is such that it will retract the head(s) from the flying position to the rest position when the fluid pressure is decreased to atmospheric pressure. As the fluid pressure is increased above atmospheric pressure, a force will be exerted tending to move the heads toward the recording medium or, otherwise stated, from the rest to the flying position. As this occurs, the spring provides a small moment tending to lift the leading edge away from the recording medium, thus providing the aforementioned positive angle of attack required for stable entry into the flying position. The moment is provided by means of the location of the bails 36 at a point slightly forward of the natural axis of rotation of the head, the line joining the centers of the two balls.

When the head is in flying position, the effect of the spring is negligible, since the force exerted by the spring is very small compared with that exerted by the fluid pressure. Even in the case where a forcing frequency of motion imparted to the head which exceeds the natural frequency of the spring is present, momentary loss of contact between bail and hook is not of importance in the flying action of the head.

It will be evident that the fluid pressure loading force applied normal to head 10 through pedestals 30 limits the head to three degrees of motion; translational motion normal to surface 12, and rotational motions about each of the axis in a horizontal plane running, respectively, perpendicular and parallel to the center-to-center line of balls 24. The former rotational motion is necessary to compensate for disparities in the forces applied to the head surface. The latter permits head 10 to assume the proper inclination when in flying position, as previously discussed; the location of the center-to-center line of balls 24 being such that the resultant forces acting upon head 10 create a small moment acting thereupon. FIGURE 3 shows, in an exaggerated manner, the positions of the leading and trailing edges 13, 15, respectively, when head 10 is so inclined in flying position.

The female conical seat 26 and the V groove seat 28 on pedestals 30 constrain rotational motion of the head about an axis mutually perpendicular to the two axes referred to above and also prevent any translational motion of the head in a plane parallel to the surface 12. The V groove in seat 28 allows freedom of motion between this seat and its associated ball 24 along the line between ball centers. The small diametral clearance between the balls and their respective cylinders causes the balls to become centered therein when the fluid pressure is applied. If freedom of motion between one ball and seat were not provided in the direction as stated above, the center-to-center dimension between the pedestals 30 would have to be exactly equal to the center-to-center dimension between the cylinders of chambers 22 for all angles of inclination about the axis in a horizontal plane running perpendicular to the center-to-center line of the balls 24. In this invention, therefore, differences between the aforesaid dimensions are automatically compensated for by permitting displacement of a ball 24 from the center of its pedestal 30.

A brief summary of the description of the operation of this invention covered by the preceding paragraphs may add clarity. A body in space, such as the transducing head in this invention, has six degrees of freedom of motion, three translational motions and three rotational motions. Strong, in his book "Procedures in Experimental Physics" published by Prentice-Hall in 1945, pages 585 to 593, describes this in relation to kinematic design. As previously described, the balls, in combination with their mating surfaces, restrict the head in three degrees of motion, thereby allowing only three degrees of freedom of motion, two rotational and one translational, as shown in FIGURE 8.

Since this force on balls 24 resulting from the fluid pressure applied through the cylinders is constant, as long as such pressure remains constant, any change in the force of the fluid cushion boundary layer acting on head 10 and tending to move it in the unresetricted translational direction, will naturally cause it to so move until a new position of equilibrium of forces is reached. Therefore, if due to irregularities of the recording surface 12, the distance of separation between head 10 and the surface 12 increases, the force on the head due to the fluid cushion will decrease. The force applied to head 10 by the fluid pressure via balls 24 will cause the head to be displaced toward surface 12 until a point of equilibrium is reached. Similarly a decrease in the separation distance between head 10 and surface 12 will increase the force on the head from the fluid cushion, causing the head to be displaced in a direction away from the surface 12. The head will thereby "fly" at a substantially constant distance from the moving surface.

Various modifications of the invention, some of which are illustrated herein, will be apparent to those skilled in the art. Thus it is usually preferable for pedestals 30 to telescope within the cylinders of chambers 22, as shown clearly in FIGURES 4, 6 and 7. This gives a wider range of movement to head 10; and when the head is in its fully retracted position, the top surface thereof will rest against the cylinders, giving an accurate reference position thereto. It is possible however to have the terminal ends of associated cylinders and pedestals incapable of telescoping, as shown in FIGURE 3.

FIGURES 5, 6, and 7 show how the illustrated mechanism of the instant invention may be utilized in tandem, with dual heads 10 located opposite dual storage surfaces 12 by two positioning mechanisms which are supported by and include a single arm 20. Since in this last-mentioned embodiment movement of arm 20 normal to surfaces 12 often cannot be avoided, the bail and hook connections are made between springs 32 and heads 10 rather than between heads and arm 20, so that forces resulting from the undesirable movement of arm 20 are not coupled to the heads.

It will thus be seen that there has been provided by this invention a mechanism in which the various objects and advantages hereinbefore set forth have been achieved. Inasmuch as modifications over and above those discussed herein will be apparent to those of ordinary skill in the art, it is intended that the matter contained in the foregoing description and the accompanying drawing be interpreted as merely illustrative and not limitative, the scope of the invention being defined in the appended claims.

What is claimed is:

1. In recording apparatus having a transducer member and a storage member movable relative thereto for effecting a fluid force separating said members, the improvement comprising: means for permitting tilt of said transducer member relative to said storage member; and positioning means for locating and maintaining said members in a predetermined separation relationship against said separating fluid force; said positioning means comprising fluid-pressure means operative to produce a force acting upon said transducer member against said separating force.

2. Apparatus as in claim 1 wherein said fluid-pressure means is in a fluid non-communicating relationship with said fluid separating force.

3. In recording apparatus having a transducer member and a storage member movable relative thereto for effecting a layer of fluid medium exerting a fluid force separating said members, the improvement comprising: means for permitting tilt of said transducer member relative to said storage member; positioning means for maintaining said members in a predetermined separation relationship against said separating fluid force, said positioning means comprising chamber means in proximity to said transducer member, said chamber means being connected to a fluid-pressure source for providing fluid pressure within said chamber means and being in fluid non-communicating relationship with said fluid medium layer, and coacting means acted upon by the fluid pressure within said chamber to transmit a force to said transducer member against the separating force.

4. The structure defined in claim 3 wherein the coacting means comprises pedestal means extending outwardly from said transducer member, seat means upon said pedestal mean, and said pedestal and chamber means are in telescoping relation.

5. The structure defined in claim 4 and further including body means engaging said seat means.

6. The structure defined in claim 3 wherein the coacting means is in telescoping relation with said chamber means.

7. The structure defined in claim 6 wherein the coacting means includes seat means on said transducer member, body means engaging said seat, and the fluid pressure force within said chamber is applied to said transducer member through said body and seat means.

8. The structure defined in claim 3 wherein the coacting means includes seat means on said transducer member, body means engaging said seat, and the fluid pressure force within said chamber is applied to said transducer member through said body and seat means.

9. The structure defined in claim 3 wherein the coacting means comprises a pair of pedestals extending outwardly from said transducer member, seat means upon the terminal portion of each of said pedestals, and ball means engaging each of said seats and movable within said chamber means respectively.

10. A data storage device comprising: a storage member provided with a recording surface; a head member having signalling means and a bearing surface in proximity to a portion of the record surface of said storage member; a viscous fluid between said surfaces; a fluid cushion generated by movement of said recording surface in said viscous fluid and exerting a separating force on said surfaces inversely related to the clearance distance therebetween; a fluid-pressure positioning means exerting an independent counteracting force on said head member producing a resultant force urging said head member to assume a position with a predetermined clearance distance between said surfaces, said fluid cushion and counteracting forces being balanced at said predetermined clearance distance, said positioning means comprising: a support arm; a pair of fluid chambers on said arm and connectable to a fluid-pressure source; a body means within each of said chambers and capable of movement in response to applied fluid pressure; a pair of seats upon said head member, each of said seats being adapted to receive one of said body means and transfer the force exerted thereby to said head member, and at least one of said seats permitting a lateral movement of its associated body means.

11. A data storage device comprising a movable storage member provided with a recording surface; a tiltable head member with a bearing surface in proximity to a portion of said recording surface, and signalling means for transmitting data between said members; a fluid cushion between said surfaces and exerting a separating force thereon; and fluid-pressure positioning means in fluid non-communicating relationship with said cushion for exerting a counteracting force on said head member urging said head member to assume a position with a predetermined clearance distance between said surfaces.

12. A device as in claim 11 wherein the positioning means comprises chamber means connected to a fluid-pressure source and in proximity to said head member, and coacting means in telescoping relation with said chamber means and actuated by the fluid pressure therein to apply the counteracting force to said head member.

13. A data storage device comprising a movable storage member provided with a recording surface; a tiltable head member having a bearing surface in proximity to said recording surface, and having signalling means for transmitting data between said members; a viscous fluid between said surfaces, and a fluid cushion generated by movement of said recording surface in said viscous fluid and exerting a separating force on said surfaces; and fluid-pressure positioning means in fluid non-communicating relationship with said cushion for exerting an independent counteracting force on said head member producing a resultant force urging said head member to assume a position with a predetermined clearance distance between said surfaces.

14. A data storage device comprising: two substantially parallel storage members provided with recording surfaces facing one another; two tiltable head members disposed between said storage members, each head member having a bearing surface and signal transmitting means in proximity to said recording surfaces; means for moving said recording surfaces to generate a fluid cushion for exerting a separating force between said bearing surfaces and said recording surfaces; fluid-pressure positioning means in fluid non-communicating relationship with said cushion for movably supporting and exerting a force on said head members counteracting said separating force to urge the head members into a position having a predetermined clearance with respect to the recording surfaces.

15. A data storage device comprising: first and second storage members substantially parallel to one another and having opposing first and second recording surfaces; a first tiltable head member adjacent said first recording surface and provided with signaling means for transmitting data between the first storage member and the first head member; a second tiltable head member adjacent to said second recording surface and provided with signaling means for transmitting data between said second storage member and said second head member; first and second bearing surfaces on said first and second head members respectively, the bearing surfaces being in proximity to a portion of the respective first and second storage members; means to move said recording surfaces relative to said bearing surfaces to create a fluid cushion between the bearing surfaces and the recording surfaces for exerting a separating force therebetween inversely related to the clearance distance; fluid-pressure positioning means in fluid non-communicating relationship with said fluid cushions for yieldably exerting a counteracting force on the bearing surfaces to urge the bearing surfaces into positions with predetermined and identical clearance relative to the respective recording surfaces.

16. A bearing arrangement comprising a movable bearing surface for creating a fluid bearing during movement of said surface, and pivotally mounted fluid bearing member spacedly disposed adjacent said surface and tiltable about an axis which is transverse to the direction of movement of said surface and in a plane that is substantially parallel to said surface at least in the area of said fluid bearing member, said member being movable toward and away from said surface and being biased away from said surface by the separating force of said fluid bearing when it occurs in the space between said surface and member, and positioning means for locating and maintaining said surface and bearing in a desired spaced relationship, said positioning means including means comprising fluid-pressure means operative to produce a force acting upon said member against the said separating force.

17. A bearing arrangement comprising a movable bearing surface for creating a fluid bearing during movement of said surface, and pivotally mounted fluid bearing member spacedly disposed adjacent said surface and tiltable about an axis which is transverse to the direction of movement of said surface and in a plane that is substantially parallel to said surface at least in the area of said fluid bearing member, said member being movable toward and away from said surface by the separating force of said fluid bearing when it occurs in the space between said surface and member, and positioning means for locating and maintaining said surface and bearing in a desired spaced relationship including means comprising fluid-pressure means in fluid non-communicating relationship with said fluid bearing for applying fluid pressure on said bearing member against the said separating force.

18. A bearing arrangement comprising a movable bearing surface for creating a fluid bearing during movement of said surface, and pivotally mounted fluid bearing member spacedly disposed adjacent said surface and tiltable about an axis which is transverse to the direction of movement of said surface and in a plane that is substantially parallel to said surface at least in the area of said fluid bearing member, said member being movable toward and away from said surface and being biased away from said surface by the separating force of said fluid bearing when it occurs in the space between said surface and member, and positioning means for locating and maintaining said surface and bearing in a desired spaced relationship including means comprising fluid-pressure means for applying fluid pressure on said bearing member with a force in opposition to and independent of the amount of said separating force.

19. A data storage device comprising: first and second storage members substantially parallel to one another and having opposing first and second recording surfaces; a first head member adjacent said first recording surface and provided with signaling means for transmitting data between the first storage member and the first head member; a second head member adjacent to said second recording surface and provided with signaling means for transmitting data between said second storage member and said second head member; first and second bearing surfaces on said head members, the bearing surfaces being in proximity to a portion of the respective first and second storage members; means to move said recording surfaces relative to said bearing surfaces to create a fluid cushion between the bearing surfaces and the recording surfaces for exerting a separating force therebetween inversely related to the clearance distance; fluid-pressure positioning means yieldably exerting a counteracting force on the bearing surfaces to urge the bearing surfaces into positions with predetermined and identical clearance relative to the respective recording surfaces, wherein the fluid-pressure positioning means includes a support arm connectable to a fluid-pressure source; a first and second pair of fluid chambers extending in opposite directions on said arm; a body means movably contained within each of said fluid chambers; a first and second pair of seats upon said first and second head members respectively, each of the seats being adapted to receive one of said body means whereby force applied to said body means would be transmitted through the seats to the associated head members.

20. A device as in claim 19 wherein at least one of each pair of seats includes an adaptation for permitting lateral movement of its associated body means.

21. A device as in claim 20 wherein said first and second pair of seats are in telescoping relation to said first and second pair of fluid chambers respectively.

References Cited by the Examiner

UNITED STATES PATENTS

| | | | |
|---|---|---|---|
| 2,262,288 | 11/41 | Klipstein et al. | 188—152.8 X |
| 2,862,781 | 12/58 | Baumeister | 179—100.2 |
| 2,937,240 | 5/60 | Harker | 340—174.1 |
| 2,972,738 | 2/61 | Slitter | 340—174.1 |

FOREIGN PATENTS

| | | |
|---|---|---|
| 1,020,803 | 12/57 | Germany. |
| 764,434 | 12/56 | Great Britain. |

IRVING L. SRAGOW, *Primary Examiner.*

EVERETT R. REYNOLDS, *Examiner.*